Sept. 12, 1950 R. S. OHL 2,522,395

ELECTRIC WAVE TRANSMISSION

Filed June 27, 1946 2 Sheets-Sheet 1

INVENTOR
R.S.OHL
BY E. V. Griggs
ATTORNEY

ELECTRIC WAVE TRANSMISSION

Filed June 27, 1946 2 Sheets-Sheet 2

INVENTOR
R. S. OHL
BY E. V. Griggs
ATTORNEY

Patented Sept. 12, 1950

2,522,395

UNITED STATES PATENT OFFICE 2,522,395

ELECTRIC WAVE TRANSMISSION

Russell S. Ohl, Red Bank, N. J., assignor to Bell Telephone Laboratories, Incorporated, New York, N. Y., a corporation of New York Application June 27, 1946, Serial No. 679,626

9 Claims. (Cl. 178—44)

This invention relates to wave transmission systems and more particularly to current supply circuits for remotely located negative resistance devices in such systems.

An object is to simplify current supply circuits for negative resistance amplifiers disposed at widely separated positions in wave transmission systems.

A further object of the invention is to provide for supply of energizing current to each of a plurality of remote negative resistance devices in such manner that the supply current for one negative resistance device shall not be affected by the other devices.

An additional object of the invention is to overcome the asymmetry of and to reduce the distortion inherent in negative resistance amplifiers of the previously known types.

Negative resistance elements utilizing point contact devices of a type produced from high purity silicon are disclosed and claimed in the copending application of R. S. Ohl, Serial No. 580,677, filed March 2, 1945, now United States Patent No. 2,469,569, issued May 10, 1949, for Point Contact Negative Resistance Devices. Among the advantages of such devices in a long transmission system are freedom from space current tubes with their attendant maintenance costs. In the specification which follows it will be understood that the negative resistance devices may be of any desired type but are preferably of the high purity silicon type disclosed and claimed in the Ohl specification to which reference has been made.

In accordance with the invention an electrically long wave transmission circuit having such attenuation between its terminals as to make necessary or desirable the use of a plurality of intermediate boosters or amplifiers introduced at intervals along the line may include negative resistance devices serving as the boosters or amplifiers. These negative resistance devices may be supplied with energizing current over a single additional conductor extending along the transmission circuit, one of the wave circuit conductors serving as the energizing current supply return. The negative resistance elements may be connected in the other wave transmission circuit conductor so that the current supply path is free from negative resistance elements and no one of the negative resistance devices will affect the current supply for the others.

Figure 1:
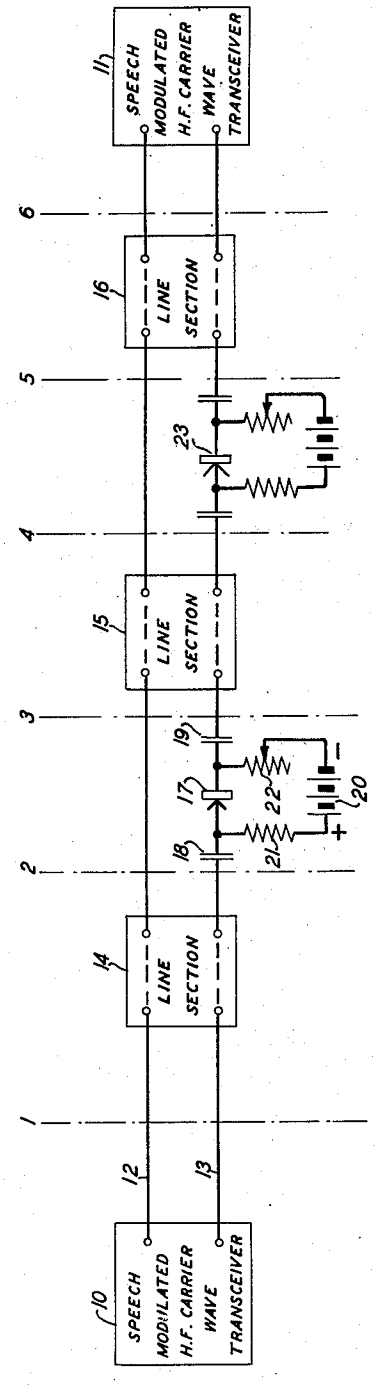
Figure 2:
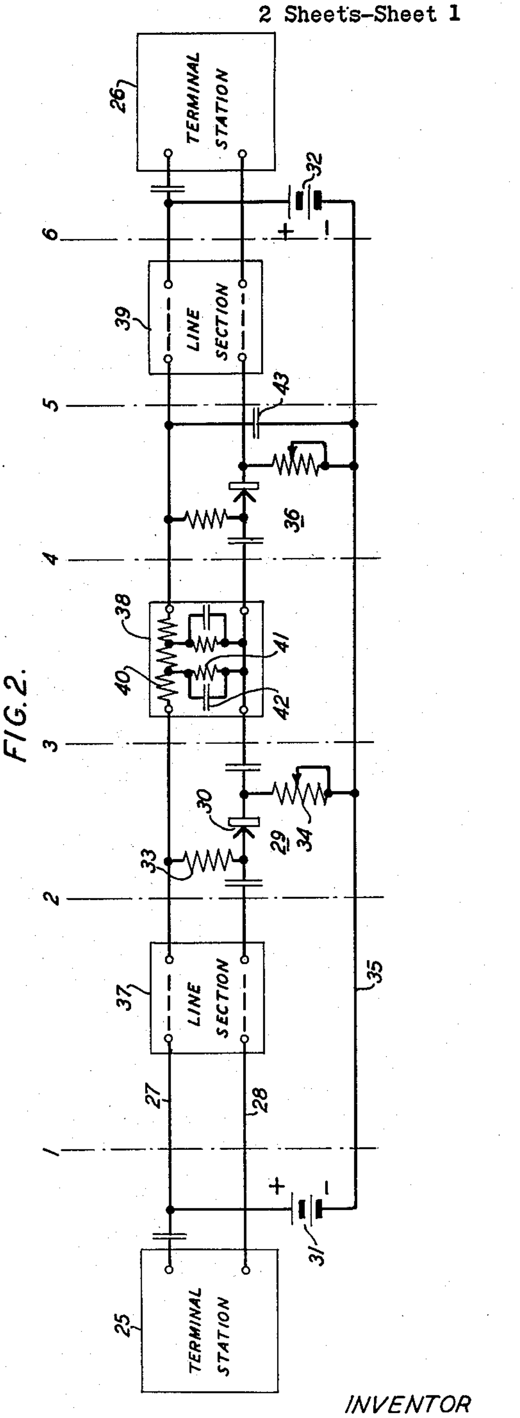
Figure 3:
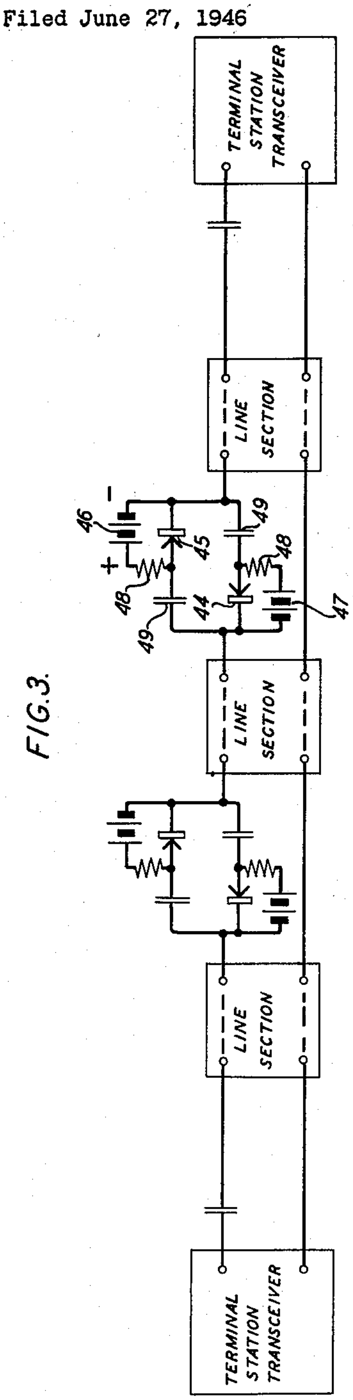
Figure 4:
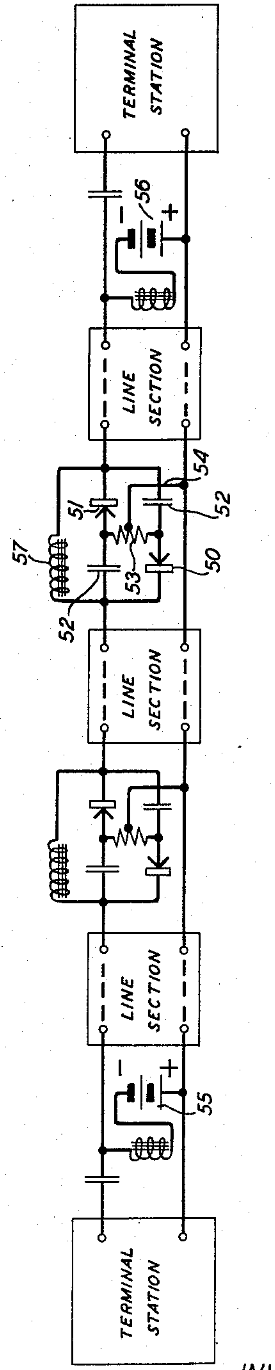

Referring to the drawing Fig. 1 is a schematic circuit diagram of a two-way carrier wave transmission system for use in explaining the invention;

Fig. 2 is a schematic circuit diagram of carrier wave transmission system constituting one embodiment of the invention;

Fig. 3 discloses an improvement in the circuit of Fig. 1 in that the repeaters comprise pairs of negative resistance devices connected in a push-pull manner, and Fig. 4 shows a system combining the features of push-pull amplifier and remote current supply.

Referring to Fig. 1, a two-way terminal apparatus 10 and 11 which, in the system illustrated, comprises speech modulated high frequency carrier wave transferers, is connected by a wave transmission circuit comprising the conductors 12 and 13 of such electrical length as to involve high attenuation of the wave transmitted between terminals 10 and 11. In order to compensate for the attenuation of the line the transmission circuit may be broken up into alternate line and repeater sections, sections 1, 2; 3, 4; 5, 6, the line sections being symbolized respectively by the blocks 14, 15 and 16. In order to compensate for the attenuation of section 14 and to restore the level of the attenuated signal waves passing from section 14 to section 15 there may be introduced between these sections a negative resistance amplifier of the type disclosed in the Ohl application, Serial No. 580,677, and said patent, connected in the manner shown in Fig. 9 of that application. The amplifier may consist of a high purity silicon contact device 17 introduced in series into the conductor 13 of the wave transmission circuit through high capacity blocking condensers 18 and 19. A local circuit comprising the source 20 of unidirectional current may be connected in series with the device 17 through resistors 21 and 22, respectively, the latter being variable to enable application of a selected potential difference to the device 17. It will be understood that with the device 17 polarized, as shown, and with the variable resistance 22 properly adjusted, the resistance which device 17 presents to alternating current crossing through the circuit 12, 13 partakes of a negative characteristic. In other words when an alternating electromotive force is impressed by the terminal 10 upon the circuit 12, 13, the highly attenuated currents which have traversed section 14 set up a difference of potential across the negative resistance contact device 17 which reacts by varying its resistance to such an extent as to draw amplified variation current from the source 20 augmenting the attenuated current and restoring it to the level at which it entered the section 14. Similarly after the transmission waves have experienced the attenuation of section 15 they are again boosted in energy by the negative resistance amplifier 23 of characteristics identical with that of the amplifier 17.

The system illustrated in Fig. 1 is electrically symmetrical so that speech modulated high frequency carrier waves originating at terminal 10 may be received at terminal 11 and similar modulated carrier waves originating at terminal 11 may be transmitted in the opposite direction over the line and received at terminal 10. The amplifiers 17 and 23 serve to amplify equally well currents traversing the line in either direction of propagation.

Fig. 2 illustrates the application of negative resistance amplifiers of the type disclosed in Fig. 1 to a two-way wave transmission system embodying applicant's invention in which the negative resistance amplifiers are supplied with energizing current for the line from the remote terminals. As in the system of Fig. 1 the two-way terminal stations 25 and 26 are connected by a transmission circuit comprising the conductors 27 and 28. The transmission circuit is illustrated in Fig. 2 as comprising three attenuating sections 37, 38 and 39 connected in tandem. Between the sections 37 and 38 is a negative resistance amplifier 29 preferably comprising a high purity contact device 30 of the same nature as the device 17 in Fig. 1. Energizing current for the device 30 is supplied from sources 31 and 32 located at the terminal stations 25 and 26 respectively. The energizing current flows from the sources 31 and 32 over the conductor 27 through the shunt resistor 33 of high impedance or a choke coil, the contact device 30 and a second resistor 34 which is made variable for purpose of the initial adjustment of the applied potential and back over a supplemental current supply return conductor 35 to the negative terminals of sources 31 and 32. A second amplifier 36 is provided between line sections 38 and 39 and its current supply may be traced from the terminal sources 31 and 32 over the conductors 27 and 35 and through a local circuit corresponding to that of amplifier 29. The amplifiers 29 and 36 will, therefore compensate for the attenuation presented by sections 37 and 38 in the case of transmission from terminal 25 toward terminal 26 and will similarly compensate for the attenuation presented by sections 39 and 38 in the case of propagation of waves from the terminal 26 toward the terminal 25.

The block 38 illustrates diagrammatically the equivalent impedance of its line section by the $\pi$ network of series resistors 40, shunt resistors 41 and shunt capacitors 42.

The local current supply paths for the amplifiers 29 and 36 are in shunt between the wave transmission conductor 27 and the current supply conductor 35. Accordingly, the negative resistance devices are in individual paths in shunt across the current supply circuit so that various currents traversing one of these devices may reach the other devices directly over the wave transmission conductors 27 and 28 but will be largely precluded from the traversing the power supply path because of the additional high resistors 34 and 36. A capacitor 43 may be connected in shunt across the conductors 27 and 35 at each repeater station to provide a low impedance path for unwanted voltages developed on the direct current supply line from other negative resistance repeater stations, from power line interference or from miscellaneous noise picked up on the feed conductor 35.

It will be seen that the circuit of Fig. 2 provides a simple and effective expedient for supply of energizing current from the terminal stations 25 and 26 to the remote amplifier or repeater 29 and 36 respectively and that it also enables these repeater stations to be provided with a constant polarizing potential which may be carefully supervised by the maintenance operators at the terminal stations.

Fig. 3 shows a system analogous to that of Fig. 1 except for the repeater circuits in which there are pairs of contact negative resistance devices 44, 45 arranged in a push-pull or symmetrical circuit. The contact devices may be polarized through local sources 46, 47 respectively each in series with a resistor 48 as in the system of Fig. 1. Capacitors 49 of large magnitude serve like capacitors 18, 19 of Fig. 1 to exclude unidirectional current from paths other than the desired polarizing paths. It will be apparent that this circuit will operate symmetrically on both negative and positive half waves of line current thus reducing distortion and production of harmonics for the same reason as does the well known push-pull electron discharge amplifier. This circuit is moreover symmetrical also from the standpoint of the direction of propagation of waves over the line, repeating from east to west as well as from west to east, as does the so-called 22 repeater.

Fig. 4 combines novel features of both Fig. 2 and Fig. 3 in its use of the symmetrical negative resistance repeater with remote current supply. In this figure the pair of negative resistance devices 50 and 51 each in series with a large blocking capacitor 52 are in a parallel path network introduced serially into the negative conductor of the line. A high resistor or a high impedance choke 53 connected between interior points of the parallel paths is provided with a center tap 54 to connect a terminal of each of the negative resistance devices 50 and 51 to the positive conductor of the line. Since the other terminals of the negative resistance devices are connected directly to the negative polarized conductor of the line the negative resistance elements draw their polarizing currents over the two conductor line from remote current supply sources 55 and 56 at the terminal stations. The repeater station is by-passed for current supply to other repeater stations over a choke coil 57 which is shunted around the negative resistance and blocking elements to constitute a current supply path substantially unaffected by the variations taking place at the local repeater. It will be apparent that this repeater circuit combines the features of freedom from vacuum tubes, distortion-reducing symmetry of the repeater structure, and two way repeating operation with remote current supply.

In this specification and in the claims the expression mid-line repeater is employed to define a repeater station electrically remote from a terminal station of the system regardless of whether it may be relatively much nearer to one terminal station than to the other.

What is claimed is:

1. An oscillation transmission system comprising a pair of conductors divided into sections of relatively large attenuation for oscillations of the frequency to be transmitted and oscillation amplifiers, one connecting each section to the next adjacent section, each of said amplifiers comprising a negative resistance device connected in series between the contiguous line sections to be subjected to the line current, each negative resistance device comprising a body of crystalline material and a fine metallic point in contact therewith, and a common source for electrically polarizing said negative resistance devices, to which said devices are connected in parallel relationship to each other with respect to said source, to cause each of said negative resistance devices to react to compensate for resistance loss in the adjacent line sections, whereby the resultant over-all attenuation of the transmission system is greatly reduced.

2. A transmission line comprising a pair of conductors extending between two widely separated points, a plurality of negative resistance elements spaced at intervals and connected in series in one of said conductors to reduce the attenuation of said line for signal currents transmitted thereover, a third conductor extending along said line and constituting with the second conductor a uni-directional current supply line for energizing said negative resistance elements, said negative resistance elements being connected in shunt relationship to each other across the current supply line.

3. An oscillation transmission system comprising a two-conductor transmission line having widely separated terminals with consequent large attenuation between the terminals for oscillations of the frequency to be transmitted, a plurality of repeaters connected in series in one conductor of said line at points relatively remote from each other and from the terminals of the line, an energizing circuit extending from one terminal of the line to the other and comprising an individual conductor and one of the conductors of said line and individual shunt connections across said energizing circuit to each of said repeaters whereby energizing current may be transmitted from a terminal of the line to each of said repeaters.

4. An oscillation transmission system comprising a pair of conductors separated into sections by intervening repeaters connecting each section to a contiguous section, said repeaters comprising negative resistance devices connected in series in one of said conductors and means for energizing said negative resistance devices comprising a source of unidirectional current adjacent one of the terminals of said system and having one terminal of said source connected to said one of said conductors and its other terminal connected to a third conductor parallel to said transmission system, said negative resistance devices being connected in individual shunt paths between the conductors to which said source is connected.

5. A symmetrical negative resistance repeater comprising two parallel paths for the waves to be amplified each including a condenser and a negative resistance contact device, the contact devices having their corresponding elements connected in reverse direction in the two paths whereby the combination of the two paths is free from asymmetry and means for supplying polarizing electromotive forces to each contact device.

6. A symmetrical negative resistance repeater comprising two oppositely poled point-to-plate contact resistance devices respectively connected in two parallel paths constituting a portion of one conductor of the repeater, a second conductor constituting the return path portion of the repeater and a common source of polarizing current for said resistance devices having one terminal connected with the parallel paths and the other terminal connected to the second conductor.

7. A transmission system comprising a pair of conductors of relatively high attenuation connecting two widely separated terminals, a mid-line repeater connected between contiguous sections of the line constituted by the two conductors to repeat and amplify currents from each of said contiguous sections to the other, said repeater comprising a pair of reversely poled negative resistance elements respectively connected in parallel paths introduced into one of the two conductors of the transmission system and a current supply source connected to said two conductors at one of the terminals to supply polarizing current over said conductors to the negative resistance elements at the mid-line repeater.

8. A transmission system comprising a pair of conductors of relatively high attenuation for electrical signal currents transmitted over said conductors, said conductors connecting two widely separated terminal stations, a mid-line repeater connected between contiguous sections of the system to repeat and amplify currents from each of said contiguous sections to the other, said repeater comprising a negative resistance device introduced in series in one of the two conductors of the transmission system, and a current supply for polarizing said negative resistance device comprising a circuit connected to the device and including a source of current at each of said terminal stations, said sources being connected in parallel relationship to each other with respect to said device.

9. The transmission system of claim 8 characterized in this that the system is provided with a plurality of mid-line repeaters connected in tandem and that the negative resistance devices of the repeaters are supplied with polarizing current by the sources at the terminal stations, with said negative resistance devices in parallel relationship to each other with respect to said sources, and with said sources in parallel relationship to each other with respect to said negative resistance devices.

RUSSELL S. OHL.

REFERENCES CITED

The following references are of record in the file of this patent:

UNITED STATES PATENTS

| Number | Name | Date |
|---|---|---|
| 1,987,440 | Habann | Jan. 8, 1935 |
| 2,101,699 | Baesecke et al. | Dec. 7, 1937 |